United States Patent
Bairamis

[19]

[11] Patent Number: 6,108,602
[45] Date of Patent: Aug. 22, 2000

[54] VEHICLE WITH NAVIGATION DEVICE

[75] Inventor: Pashalis Bairamis, Backnang, Germany

[73] Assignee: DaimlerChrysler AG, Stuttgart, Germany

[21] Appl. No.: 08/856,858

[22] Filed: May 15, 1997

[30]   Foreign Application Priority Data

May 15, 1996 [DE] Germany .............. 196 19 643

[51] Int. Cl.⁷ ................................................ G06F 17/00
[52] U.S. Cl. ............................................ 701/208; 701/36
[58] Field of Search ................................. 701/361, 200, 701/207, 208, 213

[56]         References Cited

U.S. PATENT DOCUMENTS 5,247,440  9/1993  Capurka et al. ................... 701/49

FOREIGN PATENT DOCUMENTS

| 39 18 668 | 12/1990 | Germany . |
|---|---|---|
| 43 00 927 | 7/1994 | Germany . |
| 44 10 532 | 9/1995 | Germany . |
| 4-201712 | 7/1992 | Japan . |
| 6-187595 | 7/1994 | Japan . |
| 7-032935 | 2/1995 | Japan . |
| 7-260504 | 10/1995 | Japan . |
| 7-306053 | 11/1995 | Japan . |
| 9-142232 | 6/1997 | Japan . |
| 9-207720 | 8/1997 | Japan . |
| 2 305 262 | 4/1997 | United Kingdom . |

OTHER PUBLICATIONS

R. Gramm, Satellitenhilfe gegen Auto–Klau "Using Satellites to Combat Car Theft", Funkschau 16/1993, p. 42.

Nahverkehrs–Praxis local transport in practice, No. 11/1987, p. 435.

Primary Examiner—William A. Cuchlinski, Jr.
Assistant Examiner—Edward Pipala
Attorney, Agent, or Firm—Evenson, McKeown, Edwards & Lenahan, PLLC

[57]         ABSTRACT

A vehicle includes a navigation device in which a road network, which can be travelled on, has stored therein associated data on the surroundings. The navigation device determines the position of the vehicle on the road network. The stored data on the road network surroundings includes at least data on covered road-network areas, such as tunnels and the like. The navigation device detects when the vehicle is about to travel through a covered road network area and signals this to a control unit which, in response, activates a tunnel-mode function. In the tunnel mode function, the control unit actuates certain vehicle components in a prescribable manner, in order, for example, to switch on the external vehicle lights, close the vehicle openings, switch the vehicle air-conditioning system to air recirculation mode, interrupt interior ventilation and/or switch a vehicle audio system to recorded-medium mode.

17 Claims, 1 Drawing Sheet

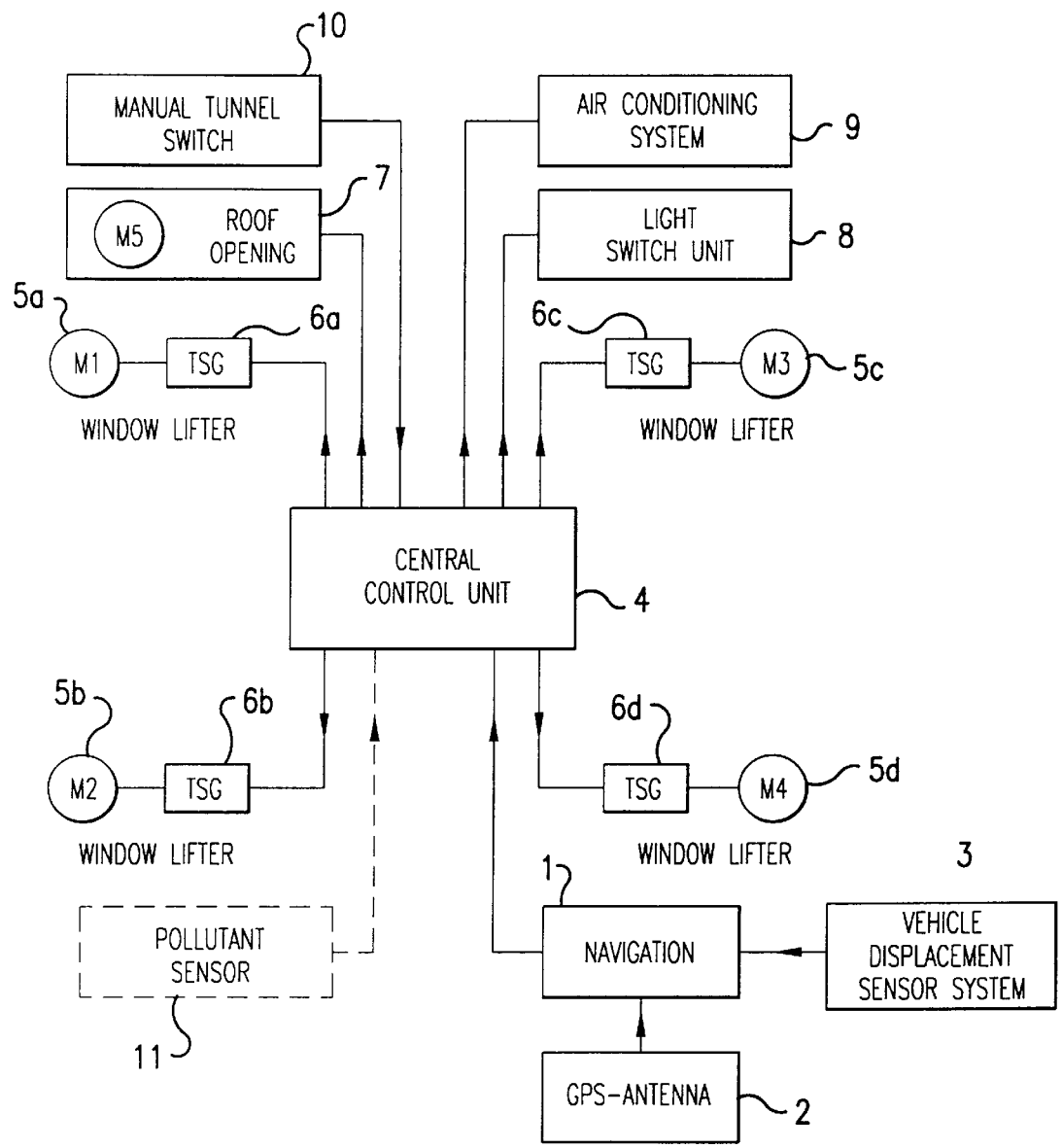

VEHICLE WITH NAVIGATION DEVICE

BACKGROUND AND SUMMARY OF THE INVENTION

The invention relates to a vehicle with a navigation device and, more particularly, to a vehicle with a navigation device in which a route or road network, which can be travelled upon by the vehicle, is stored along with associated data on the road surroundings. The navigation device contains a system for determining the position of the vehicle on the route network.

Known application purposes of such navigation devices in vehicles are to facilitate the control of the vehicle on the stored route network on which it can travel, as specified for example in German Patent document DE 39 18 668 C2, or to permit a misappropriated vehicle to be located, see for example the periodical article by R. Gramm, Satellitenhilfe gegen Auto-Klau "Using Satellites to Combat Car Theft", Funkschau 16/1993, page 42. Various means are customary for determining the position of a vehicle, for example the so-called "Global Positioning System" (GPS).

A vehicle with a navigation device of the type mentioned above is known for example from the periodical publication Nahverkehrs-Praxis "local transport in practice", No. 11/1987 page 435, the so-called "Travel Pilot" from Blaupunkt being used as a navigation device. For navigation, storage of additional information, for example on hotels, restaurants and fuel filling stations, or in the manner of a travel guide, is proposed as a future special embodiment.

In the laid-open German patent publication DE 43 00 927 A1, a computer-supported route control system for land vehicles is disclosed in which it is possible to store in an associated database, not only cartographic route systems, but also additional information in the form of static data on railway routes, the maximum vehicle heights for bridges etc. and/or in the form of dynamic data relating to information on roadworks, obstacles, traffic congestion etc.

The route or road network on which a vehicle can travel frequently has covered areas, such as tunnels, underpasses, multi-story car parks and underground garages. When a vehicle drives into such a route network area, a multiplicity of control functions have to be carried out in order to achieve a high level of driving convenience. These functions can be jointly triggered in modern cars using a so-called tunnel switch which has to be operated manually. This permits the control activations, which otherwise have to be carried out individually, to be conveniently reduced to a single activation of the tunnel switch. Typically, the tunnel-mode function which is activated in this way includes the closing of all the vehicle openings, i.e. of the windows and, if appropriate, of a sunroof, the switching-on of dipped headlights, the switching over of an air conditioning system from fresh air mode to air recirculation mode and the switching over of an audio system from radio reception to recorded-medium mode.

There is therefore needed a vehicle of the type mentioned above which, while utilizing the navigation device, provides an increased level of operating convenience, in particular for travelling on route networks having covered areas.

These needs are met according to the present invention by a vehicle having a navigation device in which a route or road network, which can be travelled on by the vehicle, is stored along with associated data on the surroundings. The navigation device contains a system for determining the position of the vehicle on the route network. The stored data on the road network surroundings include at least data on covered road network areas, such as tunnels and the like. The navigation device detects that the vehicle is about to travel through a covered road network area and signals this information to a control unit. In response, the control unit activates a tunnel-mode function and, to this end, actuates certain vehicle components in a prescribed manner. In particular, the control unit performs at least one of the following functions: switches on the external vehicle lights, closes the vehicle openings, switches a vehicle air-conditioning system to its air recirculation mode, interrupts ventilation of the vehicle interior, and sets a vehicle audio system to a recorded-medium mode.

In the navigation device of this vehicle according to the invention there is stored, inter alia, data on covered road network areas, i.e. in particular data on their precise location and length. In this way, the navigation device can detect, in conjunction with the ongoing determination of the position of the vehicle, when the vehicle is about to travel through such a covered road network area. As soon as this is the case during a trip, the navigation device transmits an appropriate message to a control unit which, in response, automatically actuates certain vehicle components in a tunnel-mode function in order to switch on the vehicle lights, close the vehicle openings, switch the air conditioning system to air recirculation mode and/or switch the audio system to recorded-medium mode. As a result, the vehicle automatically assumes the suitable operating state for travelling through the covered road network area, for example a tunnel, an underpass, a multi-story car park or an underground garage, without the driver of the vehicle having to pay attention himself to activating the tunnel-mode function. In this way, a particularly high level of operating convenience when travelling through such sections of road networks is obtained for vehicles with a navigation device and a tunnel-mode function.

In a further advantageous embodiment, the navigation device also detects when the vehicle leaves a covered road network area which it has previously travelled through, and the navigation device signals this to the control unit which, in response, advantageously automatically returns the involved vehicle components to their operating state before the tunnel-mode function is activated.

Other objects, advantages and novel features of the present invention will become apparent from the following detailed description of the invention when considered in conjunction with the accompanying drawings.

BRIEF DESCRIPTION OF THE DRAWING

The single FIGURE shows a schematic block diagram of system elements of a car according to the present invention.

DETAILED DESCRIPTION OF THE DRAWING

The car which is illustrated in the FIGURE in block diagram form, only with its elements necessary for explanation of the invention, has a navigation device of a customary design which is composed of a navigation computer unit 1, a GPS antenna 2 and a vehicle displacement sensor system 3. A road network on which the car can travel is stored in the navigation computer unit 1 together with data on the road-network surroundings, which data includes, inter alia, data on the precise location of covered areas of the road network, such as tunnels, underpasses, multi-story car parks and underground garages. By means of the GPS satellite signals which are fed to the navigation device 1 from the GPS antenna, and by means of the output signals of the vehicle displacement sensor system 3, the navigation computer unit 1 determines the instantaneous position of the vehicle on the stored road network. In addition to further functions, which are not of interest here, such as navigation aid and/or a locating capability, the knowledge of the position of the vehicle provided by the navigation computer device 1 is used to activate and deactivate a tunnel-mode function automatically when the car arrives at or leaves a covered road network area.

To this end, the navigation computer unit 1 ascertains, with reference to the continuously determined positions of the vehicle, whether the instantaneous position of a vehicle lies inside or outside a covered road area, and if it lies within such an area, whether the vehicle is immediately about to travel through such a covered road area, or has just finished travelling through one. If the navigation computer unit 1 detects that the vehicle is about to travel through a covered road area, it transmits an appropriate message signal to a central control unit 4 (a conventional processor suitably programmed to perform the described functions) via a signal line. In response, the control unit 4 triggers a tunnel-mode function by adjusting to appropriate settings the vehicle components which can be actuated and which are involved in the tunnel-mode function. In this way, it actuates four window lifting motors 5a to 5d, assigned to the respective vehicle doors, via a door control unit 6a to 6d, connected upstream in each case, in order to close the respective windows. For safety reasons, each window lifting motor 5a to 5d has an excessive-force limiter as an anti-trap device. Of course, the window lifting motors 5a to 5d can also, if appropriate, be actuated directly by the central control unit 4. Furthermore, the central control unit 4 actuates an electric sunroof unit 7 in order to close the sunroof, in which case an anti-trap device is also provided. In the case of a convertible, there may be provision here for a lowered sunroof to be closed, insofar as this is possible while driving. By actuating a light switch unit 8, the central control unit 4 also ensures that the headlights are dipped when the tunnel-mode function is activated. Furthermore, the central control unit 4 actuates an air conditioning system 9 which is present, to the effect that it switches to air recirculation mode. In addition, there may be provision, in a manner not shown, for an audio system which is present to be switched over from previous radio reception to recorded-medium mode. Depending on the application, in addition to the vehicle components mentioned above, further ones may be actuated in a respectively suitable manner when the tunnel-mode function is activated.

With these measures, the car is automatically changed to an operating state which is favorable for travelling through the subsequent, covered road area. This operating state is then maintained until the navigation computer unit 1 detects that the car has left the covered road area again. As soon as this is the case, the navigation computer unit 1 transmits an appropriate message to the central control unit 4 which, in response, deactivates the tunnel-mode function again and, to this end, returns the vehicle components 5a to 9 involved in the tunnel-mode function back to the operating state in which they had been before the tunnel-mode function was activated, insofar as this is possible in the respective case and is not replaced by other kinds of system interventions, for example by the vehicle driver.

The car shown also contains a manual tunnel switch 10 with which the tunnel-mode function described can be triggered manually by the vehicle driver. A corresponding activation of the tunnel switch is signalled via a connecting line to the central control unit 4 which, in response, activates the tunnel-mode function. As an option (therefore shown by broken lines), the car has a pollutant sensor 11 which passes on the signals indicating an increased concentration of pollutants in the vehicle surroundings to the central control unit 4. In response, the control unit triggers a modified tunnel-mode function in which, of the above-mentioned measures, only the closing of all the vehicle windows and of the vehicle roof together with the switching over of the air conditioning system 9 to air recirculation mode is carried out. This permits the ingress of pollutants into the interior of the vehicle to be prevented.

Of course, in addition to the car shown, further inventive ways of realizing vehicles with a navigation device and tunnel-mode function connected thereto are possible. For example, instead of the central control unit 4 shown, there may be provided of a plurality of parallel control units which each receive the appropriate tunnel-mode message from the navigation computer unit 1, for example via a data bus system. In vehicles with such data-bus interlinking of the vehicle-mounted control unit, the activation and deactivation of the tunnel-mode function by the navigation device can also be realized in purely software terms. Such a software implementation requires only a low degree of realization expenditure. Instead of the navigation device shown, which is based on the satellite-supported GPS, of course any other conventional navigation device can also be used.

Overall, the vehicle according to the invention thus provides a high level of driving and operating convenience as well as a high degree of safety by virtue of the fact that, when the vehicle enters a covered road network area, the lights are switched on automatically, no exhaust gases enter the interior of the vehicle and the driver does not need to divert his attention from the driving activity.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A control system for a vehicle, comprising:
   a navigation device storing a road-network and associated data on road-network surroundings, said navigation device including means for determining a position of the vehicle on the road network;
   wherein said road-network surroundings include data on at least covered road-network areas; and
   wherein said navigation device is operable to detect when the vehicle is about to travel through said covered road-network areas and provides a covered road-network signal;
   a control unit which receives said covered road-network signal and, in response, activates a tunnel-mode function, said tunnel-mode function operating to at least set a vehicle audio system to a recorded-medium mode.

2. The control system according to claim 1, wherein said navigation device is operable to detect when said vehicle leaves a covered road-network area and provides a leaving covered road network area signal to said control unit; and
   wherein in response, said control unit deactivates said tunnel-mode function and adjusts said vehicle audio system to an original state before said tunnel-mode function was activated.

3. The control system according to claim 1, wherein said data on covered road-network areas include data on at least one of tunnels, parking garages, and underpasses.

4. The control system according to claim 2, wherein said data on covered road-network areas include data on at least one of tunnels, parking garages, and underpasses.

5. A method for operating a vehicle having a control unit and a navigation device in which a road network is stored together with associated road network surrounding data, the method comprising the steps of:

storing road-network surrounding data on at least covered road-network areas;

signalling with said navigation device when the vehicle is about to travel through one of said covered road-network areas;

based on said signalling, automatically controlling a vehicle audio system to set the vehicle audio system to a recorded medium mode.

6. The method according to claim 5, further comprising the step of:

signalling with said vehicle navigation system when said vehicle leaves a respective one of said covered road-network areas; and in response to said leaving signal, deactivating said automatic controlling of the vehicle audio system so as to return said vehicle audio system to an original state.

7. A control system for a vehicle, comprising:

a navigation device storing a road-network and associated data on road-network surroundings, said navigation device determining a position of the vehicle on the road network;

wherein said road-network surroundings include data on at least covered road-network areas; and wherein said navigation device is operable to detect when the vehicle is about to travel through said covered road-network area and provides a covered-road network signal; and a control unit, which receives said covered road-network signal and, in response, activates a tunnel-mode function, said tunnel-mode function operating to at least close a vehicle sunroof.

8. The control system according to claim 7, wherein said navigation device is operable to detect when said vehicle leaves a covered road-network area and provides a leaving covered road network area signal to said control unit; and wherein in response, said control unit deactivates said tunnel-mode function and adjusts said vehicle sunroof to an original state before said tunnel-mode function was activated.

9. A method for operating a vehicle having a control unit and a navigation device in which a road network is stored together with associated road network surrounding data including data on at least covered road-network areas, the method comprising the steps of:

signalling with said navigation device when the vehicle is about to travel through one of said covered road-network areas; and based on said signalling, automatically controlling a vehicle sunroof to close the vehicle sunroof.

10. The method according to claim 9, further comprising the steps of:

signalling with said vehicle navigation system when said vehicle leaves a respective one of said covered road-network areas; and in response to said leaving signal, deactivating said automatic controlling of the vehicle sunroof so as to return said vehicle sunroof to an original state.

11. A control system for a vehicle, comprising:

a navigation device storing a road-network and associated data on road-network surroundings including data on at least covered road-network areas, said navigation device determining a position of the vehicle on the road-network and being operable to detect when the vehicle is about to travel through said covered road-network areas so as to provide a covered road-network signal;

a pollutant sensor providing a pollutant signal indicating an increased concentration of pollutants in the vehicle surroundings; and a control unit receiving as inputs said covered road-network signal and said pollutant signal, wherein said control unit activates a tunnel-mode function in response to said covered road-network signal from said navigation device, and activates a modified tunnel-mode function in response to said pollutant signal from the pollutant sensor, said modified tunnel-mode function actuating in a prescribed manner only a portion of certain vehicle components actuated in the tunnel-mode function.

12. The control system according to claim 11, wherein said certain vehicle components comprise external vehicle lights, vehicle openings, and a vehicle air-conditioning system.

13. The control system according to claim 12, wherein said modified tunnel-mode function actuates a closing of the vehicle openings and a switching of the vehicle air-conditioning system to an air recirculation mode.

14. The control system according to claim 13, wherein said vehicle openings comprise both vehicle windows and a vehicle sunroof.

15. A method for operating a vehicle having a control unit, a navigation device in which a road network is stored together with associated road network surrounding data including data on at least covered road-network areas, and a pollutant sensor for sensing increased concentrations of pollutants in areas surrounding the vehicle, the method comprising the steps of:

detecting a presences of either a covered road-network signal from the navigation device or a pollutant signal from the pollutant sensor;

when said covered road-network signal is detected, automatically implementing a tunnel-mode in which a defined set of vehicle functions are operated; and when said pollutant signal is detected, automatically implementing a modified tunnel-mode in which only some of said defined set of vehicle functions are operated.

16. The method according to claim 15, wherein said defined set of vehicle functions include at least two of the following functions:

switching on external vehicle lights, closing vehicle openings, switching a vehicle air-conditioning system to an air recirculation mode, interrupting ventilation of a vehicle interior, and setting a vehicle audio system to a recorded-medium mode.

17. The method according to claim 16, wherein said modified tunnel-mode operates at least some of the defined set of vehicle vehicles which prohibit ingress of pollutants into a vehicle interior.

* * * * *